Patented May 12, 1936

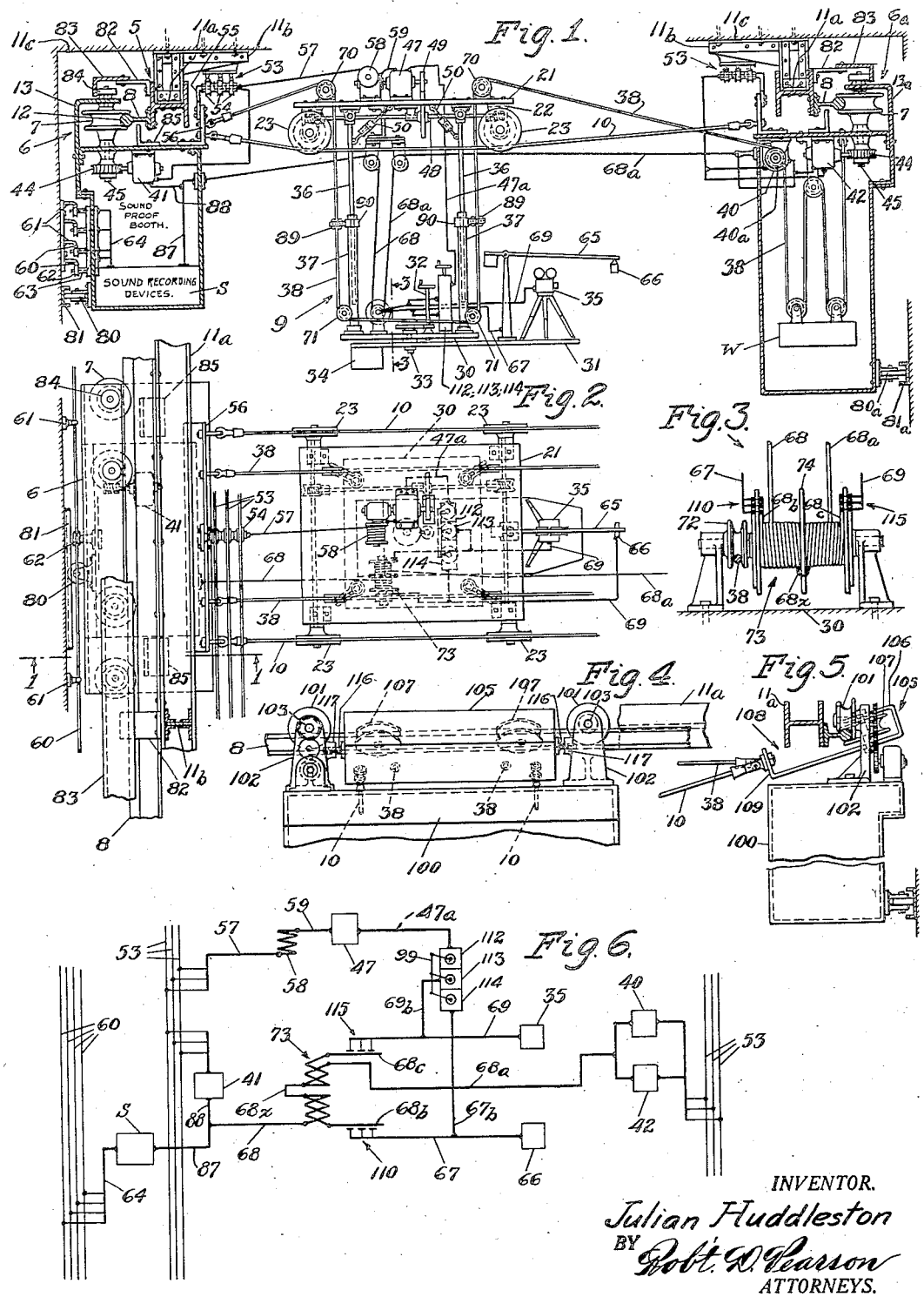

2,040,610

UNITED STATES PATENT OFFICE 2,040,610

CARRIER MOUNTING AND OPERATING MEANS

Julian Huddleston, Los Angeles, Calif.

Application July 3, 1934, Serial No. 733,549

4 Claims. (Cl. 104—98)

This invention relates to a carrier mounting and operating means. Although more particularly intended for use in conveying a motion picture camera and sound recording apparatus across extended spaces in picture production work, the invention is, nevertheless, capable of a variety of other possible uses. Among such other uses may be mentioned transmitting scenes and sound for television, as well as other uses of which the cable-suspended apparatus described may be capable.

Among the objects of the invention are to provide a simple mechanism to support a moving picture camera and sound recording apparatus for a universal direction movement; to provide for conveniently conveying the camera and apparatus synchronized therewith across wide stretches of space; to furnish means for combining the movements just stated, in such a manner that a camera, while being conveyed across space may be turned in various directions for picture taking; to provide improved means for moving the camera both vertically and horizontally, and along with other improved features to construct the apparatus as a whole in such a manner that it will be convenient to install and operate, and will be relatively inexpensive to construct.

Other objects, advantages and features of the invention may hereinafter appear.

Referring to the accompanying drawing, which illustrates what is at present deemed to be a preferred embodiment of the invention, Fig. 1 is a somewhat diagrammatic side elevation of the apparatus, portions thereof being broken away to contract the view.

Fig. 2 is a plan view of the structure shown in Fig. 1 except that some parts, similar in construction are shown but a single time.

Fig. 3 is an enlarged sectional detail on line 3—3 of Fig. 1.

Fig. 4 is a modified elevational view of one of the trucks.

Fig. 5 is an end view of Fig. 4.

Fig. 6 is a general electric wire and cable diagram of the apparatus.

Referring in detail to the drawing, the general construction shown in Figs. 1 and 2 includes the two transversely extending elevated tracks 5; trucks 6 and 6a having wheels 7 to travel upon the rails 8 of said tracks; an intermediate adjustable carrier assembly 9; and transversely extending cables 10 to suspend said carrier upon and between said trucks.

Each rail 8 is secured to and extends laterally from an elongated elevated suspension member 11a which will ordinarily lie in a substantially horizontal plane. The rails 8 have convex tread portions 12 which are directed away from the midwith of the apparatus.

To the inner side piece or plate of each of the truck frames 13 and 13a are secured the main suspending cables 10 which support the carrier assembly 9. The carrier assembly 9 has a head member 21 furnished with bearing portions 22 carrying grooved wheels 23 that travel upon the main cables 10.

The carrier assembly 9 is provided with a vertically adjustable platform 30 from which is, in turn, suspended a table 31 that may be rotationally adjusted. The platform 30 is built to support two or more operators, and is shown supplied with a manually rotatable upstanding shaft 32 which is operatively connected with the table 31 in order that the latter may be manually rotated. Said table is pivotally mounted at 33 and operated manually or mechanically rotated by a motor and may be furnished with a counterweight 34.

A motion picture camera 35 is shown mounted upon the portion of said table which projects laterally beyond the platform 30. Said platform is guided in its vertical adjustments by means of the rods 36 within the sleeves 37, the vertical position of the platform being controlled by the pulley-guided cable 38. At one side of the apparatus the cable 38 is made fast to the truck frame 13 and at the other side of the apparatus said cable 38 is led into the truck frame 13a where the desired amount of slack is taken up therefrom by means of the motor 40 and cooperating weight W, the pulley 40a being fixed to the shaft of said motor.

In order to propel all the traveling parts of the apparatus along the rails 8, the two cooperating, synchronized motors 41 and 42 are provided, being respectively located within the truck frames or housings 13 and 13a. Said motors, by means of worm gearing 44, drive the axles 45 of the two pairs of the truck wheels 7.

The carrier assembly 9 is suspended upon the cables 10 by means of the four supporting wheels 23 which are arranged in two pairs and all of which are simultaneously driven by the motor 47 through the shafting 48, gearing 49, worm gears 49a and axles 48a.

Owing to the fact that the central portions of cables 10 necessarily sag somewhat, when the carrier assembly 9 approaches either the truck frame 13 or 13a its head member 21 will tilt away from the horizontal, thus tending to impart an objectionable swinging movement to the carrier, which movement may be augmented by inertia as the lateral movement of the carrier is stopped. Hence in order to check sudden tilting movements, each rod 36 has its upper portion connected with a diagonally positioned dash-pot 50 which, like a door-check, slows down the tendency toward swinging movement. One end portion of the dash pot is secured pivotally to said rod and its opposite end portion is pivotally secured to the head member 21.

The motor 47 is shown as a three phase motor and is furnished with current from a three line overhead trolley wire 53 with which cooperates the three trolley wheels 54 mounted upon the truck housing 13 by means of the brackets 55 and 56. From the multiple trolley wheel 54 current is conveyed through the multiple wire cable 57 and the cable take up device 58 to the cable section 59 which leads to the motor 47 that drives the wheels 23.

The sound recording devices labeled in the left hand portion of Fig. 1 derive current from a plurality of trolley wires 60 carried by brackets 61. The trolley wheels 62, supported by brackets 63 cooperate with said wires 60, and through leads 64 convey current to said sound recording devices.

Upon the table 31 is mounted a balanced arm 65 with a microphone 66 which is electrically connected, by means of the wire 67, with the aforesaid sound recording devices by the cable 68. The camera 35 is also furnished with a lead 69 to record the sound waves on the picture film, said lead being included in with said cable 68, to electrically connect the microphone and sound recording devices.

The aforementioned cable 38, whereby the carrier assembly 9 is moved along its supporting cables 10, is led over and between a pair of grooved upper guide wheels 70 and outside of and below a pair of lower grooved guide wheels 71. The portion of the cable between said lower guide wheels contacts frictionally with a grooved wheel 72 (see Fig. 3) which is fixed to and alines axially with a rotary drum 73 which is divided into two winding sections by means of a central circumferential flange 74.

Near its lower end the truck housing 13 carries a guide wheel 80 that travels upon a channel-iron rail 81. A like wheel 80a and rail 81a are furnished for the truck housing 13a. The two overhead rail supports 11a are each furnished with a series of alined brackets 82 which carry angular guard rails 83.

On the portion of the drum 73 to the left of the flange 74 (see Fig. 3) may wind the multiple conductor 68, at which time a conductor 68a will unwind upon the opposite end portion of said drum, the latter conductor leading to the motors 40 and 42.

The multiple conductor 68 will contain any wires necessary for the control of motors, sound devices or other electrically operated equipment. In the drawing a cable 87 is shown representing a plurality of wires coming from the sound recording devices, and a cable 88 connecting with the motor 41. The currents carried by these cables, after passing through the cable 68, and left hand portion of reel 73, are distributed by the multiple brush device 110. The cable 68, after being coiled around the reel, is furnished with an end portion 68b to connect with the brushes 110. At the opposite end of the reel or drum 73 a set of brushes 115 segregate the currents conveyed to the camera 35 by the cable 69.

From said multiple brush device 110 leads the cable 67 which affords electrical connection with the microphone 66, said cable 67 having a branch 67b to control the power circuit to the hoisting motor 40 by means of the controller 114.

At the opposite end of the reel 73 the multiple brush 115 transmits currents to cable 69 which leads to the camera 35. Said cable 69 has a branch cable 69b to controller 113 to control the power circuit to the truck motors 41 and 42.

From the motor 47 which drives track wheels 23 leads a cable 47a to the controller 112. A common lever 99 affords a single means for operating the three controllers 112, 113 and 114.

In the right hand portion of the reel 73, as viewed in Fig. 3, the cable 68a, after being coiled around the reel, is provided with an end portion 68c to form an electrical connection with the multiple brush 115.

The object of the cable 68x shown in Fig. 3 is to electrically connect such leads in the cables on the reel as required to be connected to secure the proper operation of the apparatus.

Referring to certain details of construction, in order to aid in stabilizing the platform 30 against inclination from the horizontal, to the upper portion of each sleeve or plunger barrel 37 is secured an outwardly extending bracket 90 having mounted upon it a pair of fair-leads 89 between which the connection 38 passes, near each corner of the carrier assembly 9.

The means for supporting and reinforcing the rails 8 may include H-beams 11a to which the said rails are riveted at intervals. Said supports 11a are suspended by brackets 11b which are secured to the ceiling member 11c.

In the operation of the apparatus, the persons required to operate the same will mount the platform 30 and, through the electrical controls which have been described, will put into operation the synchronized motors 41 and 42 to move the trucks 6 and 6a along the rails 8 in the direction desired. At the same time the motor 47 will be operated to rotate the wheels 23 and thereby transport the carrier assembly 9 to the desired point of suspension upon the cables 10. While these operations are taking place the motor 40, through the cable 68a, will be furnished with controlled currents to rotate the pulley 48a in the direction required to cause the weighted cable 38 to raise or lower the platform 30.

A modification is shown in Figs. 4 and 5, said modification not affecting the construction of the carrier assembly 9, but only of the parts seen at the right and left thereof in Fig. 1. In said modification the truck 100 is supported upon the rail 8 by means of the track wheels 101 which are mounted upon the end portions of said truck by the upstanding brackets 102. Each of said brackets has fixed thereto a laterally extending stub shaft 103 to form an axle for the wheel at that end of the truck. The truck 100, in other respects, may be constructed in the same manner as the truck 13a.

Between the upstanding brackets 102 an auxiliary truck frame 105 is shown consisting of a plate which, as viewed in cross section, partly incloses a rectangular space. At its outer or upper side said plate has a yoke or hanger portion 106 within the end portion of which are mounted track wheels 107. A space 108 provided at one side of said plate affords room for the rail support 11. To the foot portion 109 of the plate is secured the carrier suspension cables 10, and the carrier moving cables 38.

The aforesaid auxiliary truck frame 105 can tilt independently of the truck 100 and the grooved wheels 107 thereof will make equally good contact with the rails at different inclinations owing to the convex character of the tread portions of said rails.

It is to be understood that, at the opposite side of the apparatus the construction of the upper portion of the truck 13 will be modified in accordance with the construction shown in Figs. 4 and 5; but the construction below the level of the brackets 56 may remain the same.

In order to allow the truck frame 100 to swing freely it is kept in spaced relation to the brackets 102 by means of cap-screws 116 carried by said brackets. Said screws are screwed into the bracket bosses 117 and their heads slide upon the adjacent end portions of the truck frame 100 during the swinging of the latter.

I claim:

1. In an apparatus of the kind described, the combination, with a travelling overhead supporting means; of a carrier suspended from said means, telescopic connections between said means and carrier comprising rods and cylinders, cables to suspend said carrier from said means, and fair-leads through which said cables pass, said fair-leads being mounted upon said cylinders.

2. In an apparatus of the kind described, an overhead track, supporting means to travel along said track, a carrier spaced vertically below said supporting means, a plurality of telescopic connections extending from said supporting means to points on said carrier at different sides of the center of gravity thereof, and hoisting and suspending means to suspend said carrier at various distances below said supporting means, said suspending means including cables extending downwardly from said supporting means, there being fair-leads for said cable mounted upon said telescopic connections.

3. In an apparatus of the kind described, an overhead track, supporting means to travel along said track, a carrier spaced vertically below said supporting means, a plurality of telescopic connections extending from said supporting means to points on said carrier at different sides of the center of gravity thereof, and hoisting and suspending means to suspend said carrier at various distances below said supporting means, said suspending means including cables anchored in spaced relation to opposite sides of said supporting means, upper pulleys mounted on said supporting means over which said cables are led, and lower pulleys mounted on said carrier under which said cables are led to serve as a levelling means for said carrier.

4. In an apparatus of the kind described, an overhead track, supporting means to travel along said track, a carrier spaced vertically below said supporting means, and hoisting and suspending means to suspend said carrier at various distances below said supporting means, said suspending means including cables anchored in spaced relation to opposite sides of said supporting means, upper pulleys mounted on said supporting means over which said cables are led, and lower pulleys mounted on said carrier under which said cables are led to serve as a levelling means for said carrier.

JULIAN HUDDLESTON.